US007142150B2

(12) United States Patent
Thackray (10) Patent No.: US 7,142,150 B2
(45) Date of Patent: Nov. 28, 2006

(54) METHOD AND SYSTEM FOR DETECTING AN OBJECT USING A COMPOSITE EVIDENCE GRID

(75) Inventor: Robert George Thackray, Fargo, ND (US)

(73) Assignee: Deere & Company, Moline, IL (US)

( * ) Notice: Subject to any disclaimer, the term of this patent is extended or adjusted under 35 U.S.C. 154(b) by 175 days.

(21) Appl. No.: 11/013,243

(22) Filed: Dec. 15, 2004

(65) Prior Publication Data

US 2006/0125680 A1 Jun. 15, 2006

(51) Int. Cl.
G01S 13/86 (2006.01)
G01S 13/04 (2006.01)
G01S 13/08 (2006.01)
G01S 13/93 (2006.01)

(52) U.S. Cl. ............... 342/54; 342/27; 342/28; 342/52; 342/70; 342/89; 342/90; 342/118; 342/146; 342/147; 342/175; 342/195; 701/300; 701/301

(58) Field of Classification Search ............ 342/27, 342/28, 52, 54, 70–72, 89–103, 118, 128–146, 342/175, 195, 147–158; 701/300, 301; 180/167–169
See application file for complete search history.

(56) References Cited

U.S. PATENT DOCUMENTS

| 3,514,776 | A | * | 5/1970 | Mulready | 342/54 |
| 3,714,898 | A | * | 2/1973 | Ziemba | 342/54 |
| 3,924,232 | A | * | 12/1975 | Burdi et al. | 342/54 |
| 5,471,214 | A | * | 11/1995 | Faibish et al. | 342/70 |
| 5,781,147 | A | * | 7/1998 | Elliott et al. | 342/54 |
| 6,042,050 | A | * | 3/2000 | Sims et al. | 342/54 |
| 6,061,015 | A | * | 5/2000 | Sugimoto | 342/71 |
| 6,246,355 | B1 | * | 6/2001 | Miceli et al. | 342/175 |
| 6,268,822 | B1 | * | 7/2001 | Sanders et al. | 342/54 |
| 6,297,732 | B1 | * | 10/2001 | Hsu et al. | 342/54 |
| 6,452,535 | B1 | * | 9/2002 | Rao et al. | 342/72 |
| 6,522,284 | B1 | * | 2/2003 | Miceli et al. | 342/195 |

(Continued)

FOREIGN PATENT DOCUMENTS

WO 2004/111938 A1 3/2004

OTHER PUBLICATIONS

Daniel Arbuckle, Andrew Howard, Maja Mataric; Title: Temporal Occupancy Grids: a Method for Classifying the Spatio-Temporal Properties of the Environment; University of Southern California.

(Continued)

Primary Examiner—Bernarr E. Gregory (57) ABSTRACT

A method and system for detecting an object uses a composite evidence grid based on dual frequency sensing. A source transmits a laser transmission in a first zone. A detector receives a reflection of the laser transmission from an object in the first zone to determine laser observed data associated with points on the object. A transmitter transmits a radar transmission in a second zone that overlaps with the first zone. A receiver receives a reflection of the radar transmission from an object in the second zone to determine radar observed data associated with points on the object. The laser observed data is processed to form a laser occupancy grid for the first zone and the radar observed data is processed to form a radar occupancy grid for the second zone. An evaluator evaluates the radar occupancy grid and the laser occupancy grid to produce a composite evidence grid for at least an overlapping region defined by the first zone and the second zone.

23 Claims, 7 Drawing Sheets

U.S. PATENT DOCUMENTS 6,771,208 B1 * 8/2004 Lutter et al. ............... 342/54
6,853,327 B1 * 2/2005 Miceli et al. ............. 342/195
6,906,659 B1 * 6/2005 Ramstack ................. 342/54

OTHER PUBLICATIONS

Dirk Langer; Title: An Integrated MMW Radar System for Outdoor Navigation; Carnegie Mellon University: Jan. 1997.

Alex Fossel; Title: Scene Modeling from Motion-Free Radar Sensing: May 1999.

Dirk Schulz and Wolfram Burgard; Title: Probabillistic state estimation of dynamic objects with a moving mobile robot.

Alex Fossel-Bunting, John Bares, William Whittaker; Title: Three-Dimensional Map Building With MMW Radar; Carnegie Mellon University.

Sebastian Thrun; Title: Learning Occupancy Grids with Forward Models; Carnegie Mellon University.

Sebastian Thrun: Title: Learning Occupancy Grid Maps With Forward Sensor Models; Carnegie Mellon University.

Alex Fossel; Title: Scene Modeling from Motion-Free Radar Sensing; Carnegie Mellon University; Jan. 2002.

Coué, C.; Fraichard, Th.; Bessiére, P.; Mazer, E. Multi-Sensor Data Fusion Using Bayesian Programming: an Automotive Application, Proceedings of the 2002 IEEE/RSJ International Conference on Intelligent Robots and Systems, pp. 141-146, 2002.

Young, E.; Tribe, R.; Conlong, R. Improved Obstacle Detection By Sensor Fusion, IEEE Colloquium on "Prometheus and DRIVE," pp. 2/1-2/6, 1992.

Ma, B.; Lakshmanan, S.; Hero, A. A Robust Bayesian Multisensor Fusion Algorithm for Joint Lane and Pavement Boundary Detection, Proceedings of the 2001 International Conference on Image Processing, pp. 762-765, 2001.

Coué, C.; Fraichard, Th.; Bessiére, P.; Mazer, E. Using Bayesian Programming for Multi-Sensor Multi-Target Tracking in Automotive Applications, Proceedings of the 2003 IEEE International Conference on Robotics & Automation, pp. 2104-2109, 2003.

* cited by examiner

Laser Occupancy Grid

|  $P_{11}$ | • • | | | | | | |
|---|---|---|---|---|---|---|---|
| | | | | | | | |
| | | | | | | | |
| | | | $P_{44}$ | $P_{45}$ | | | |
| | | | | | | | |
| | | | | | | | |
| | | | | | | | |
| | | | | | | | |
| | | | | | | • • | $P_{NM}$ |

Typical Laser Field of View
In Horizontal Plane (e.g., 180°)

Fig. 5

Radar Occupancy Grid

| $B_{11}$ | • • | | |
|---|---|---|---|
| | | | |
| | | | |
| | $B_{4,2}$ | $B_{4,3}$ | |
| | | | |
| | | | |
| | | | |
| | | | |
| | | • • | $B_{XY}$ |

Typical Radar Field of View
In Horizontal Plane (e.g., 40°)

Fig. 6

Composite Evidence Grid

| | | O | X | X | O | | |
|---|---|---|---|---|---|---|---|
| | | O | X | X | O | | |
| | | O | X | X | O | | |
| | | O | I | I | O | | |
| | | O | O | O | O | | |
| | | O | O | O | O | | |
| | | O | O | O | O | | |
| | | O | O | O | O | | |
| | | O | O | O | O | | |

↑ Overlapping Region (700)
↖ Non-Overlapping Region (701) ↗

Fig. 7  Key
O = Object is absent
I = Object is present
X = Unknown

Augmented Evidence Grid

| O | O | O | X | X | O | O | I |
|---|---|---|---|---|---|---|---|
| O | O | O | X | X | O | O | I |
| O | O | O | X | X | O | O | O |
| O | O | O | I | I | O | O | O |
| O | O | O | O | O | O | O | O |
| O | O | O | O | O | O | O | O |
| O | O | O | O | O | O | O | O |
| O | O | O | O | O | O | O | O |
| O | O | O | O | O | O | O | O |

↑ Laser Contributions ↑
To Non-Overlapping Region (702)

Fig. 8  Key
O = Object is absent
I = Object is present
X = Unknown

METHOD AND SYSTEM FOR DETECTING AN OBJECT USING A COMPOSITE EVIDENCE GRID

FIELD OF THE INVENTION

This invention relates to a method and system for characterizing an object using a composite evidence grid based on dual frequency sensing.

BACKGROUND OF THE INVENTION

In the prior art, a laser range finders have been used to determine representations of objects in a field of view. However, the performance of the laser range finder may be degraded by precipitation, fog, rain, high humidity, or dust. Thus, there is a need for enhancing the reliability and performance of the laser range finder in the presence of precipitation, fog, rain, high humidity, and dust.

SUMMARY OF THE INVENTION

In accordance with one embodiment of the method and system for detecting an object, a method and system for detecting an object uses a composite evidence grid based on dual frequency sensing. A source transmits a laser transmission over a first frequency range in a first zone. A detector receives a reflection of the laser transmission from an object in the first zone to determine laser observed data associated with points on the object. A transmitter transmits a radar transmission over a second frequency range in a second zone that overlaps with the first zone. A receiver receives a reflection of the radar transmission from an object in the second zone to determine radar observed data associated with points on the object. The laser observed data is processed to form a laser occupancy grid for the first zone and the radar observed data is processed to form a radar occupancy grid for the second zone. An evaluator evaluates the radar occupancy grid and the laser occupancy grid to produce a composite evidence grid for at least an overlapping region defined by the first zone and the second zone.

DESCRIPTION OF THE PREFERRED EMBODIMENT

Figure 1:
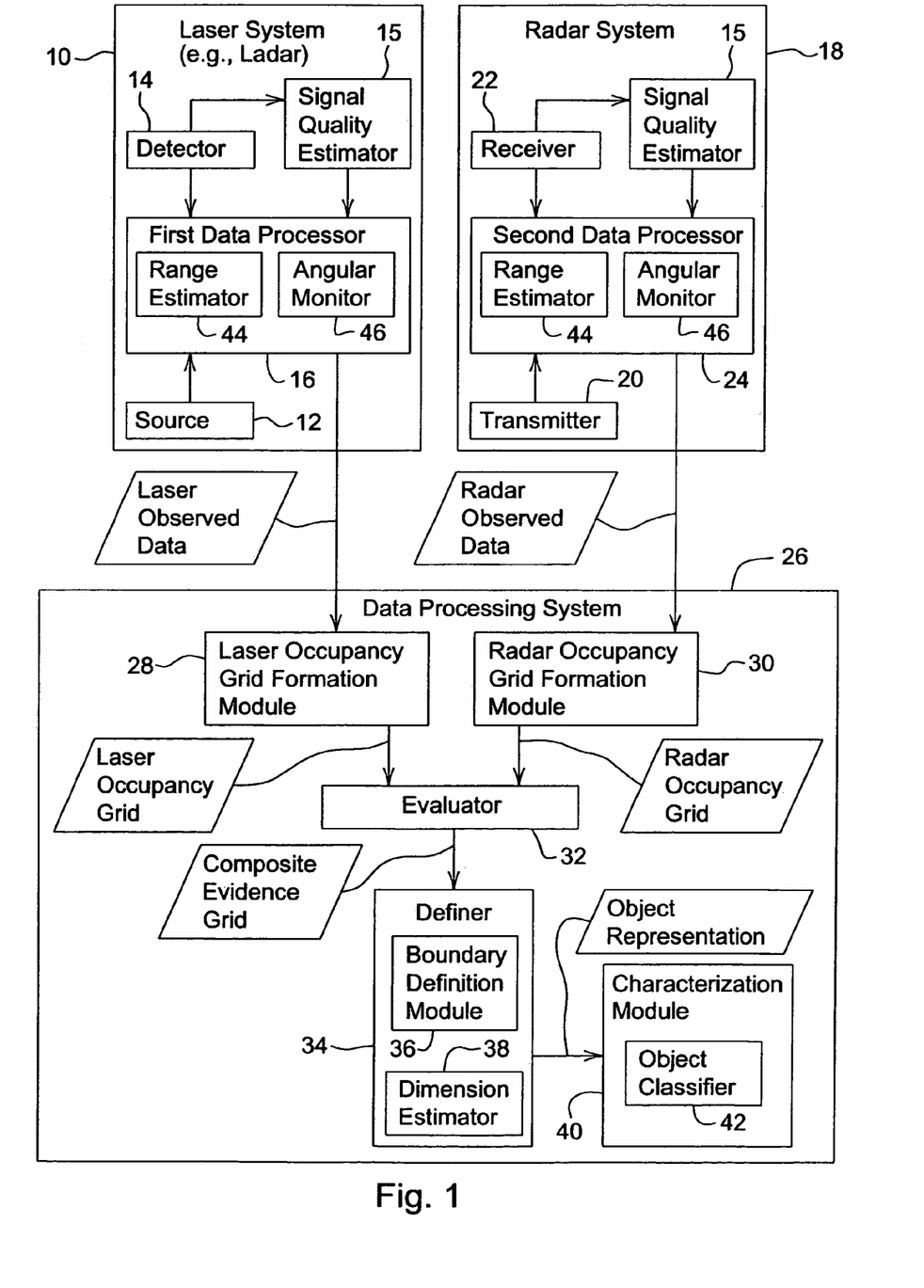
FIG. 1 is a block diagram of a system for detecting or characterizing an object associated with a vehicle.

In accordance with FIG. 1, a laser system 10 and a radar system 18 are coupled to a data processing system 26. The laser system 10 (e.g., ladar or laser range finding system) comprises a source 12, a detector 14, a signal quality estimator 15, and a first data processor 16. The radar system 18 comprises a transmitter 20, a receiver 22, a signal quality estimator 15, and a second data processor 24. The data processing system 26 comprises a laser occupancy grid formation module 28, a radar occupancy grid formation module 30, an evaluator 32, a definer 34, and a characterization module 40.

In accordance with FIG. 1, a source 12 transmits a laser transmission in a first frequency range at a known angular orientation in a first zone. A detector 14 receives a reflection of the laser transmission from an object in the first zone to determine laser range data associated with points on the object for known angular orientation data. A transmitter 20 transmits a radar transmission in a second frequency range at a known angular position in a second zone that overlaps with the first zone. The first frequency range is distinct from the second frequency range. A receiver 22 receives a reflection of the radar transmission from an object in the second zone to determine radar range data associated with points on the object for known angular position data. The laser range data and corresponding angular orientation data is processed to form a laser occupancy grid for the first zone. The radar location data and corresponding angular position data is processed to form a radar occupancy grid for the second zone. An evaluator evaluates the radar occupancy grid and the laser occupancy grid to produce a composite evidence grid for at least an overlapping region defined by the first zone and the second zone.

The source 12 transmits a laser transmission in a first zone. The laser transmission may be in a first frequency range, including visible light, ultraviolet light, infra-red, and near-infrared. A detector 14 receives a reflection of the laser transmission from an object in the first zone to determine laser location data associated with points on the object. A transmitter 20 transmits a radar transmission in a second zone that overlaps with the first zone. The radar transmission may be in a second frequency range, different from the first frequency range. The second frequency range may lie within the microwave spectrum or a band therein (e.g., 35 GHz to 94 GHz). A receiver 22 receives a reflection of the radar transmission from an object in the second zone to determine radar location data associated with points on the object.

In the laser system 10, the first data processor 16 comprises a range estimator 44 for estimating laser range data associated with an object (if any) in a field of view (or the laser system 10) and an angular monitor 46 for measuring and archiving angular orientation data of a laser transmission (e.g., pulse) or beam transmitted from the laser system 10. The laser system 10 communicates laser observed data (e.g., laser range data and corresponding angular orientation data) to the laser occupancy grid formation module 28 or the data processing system 26.

The second data processor 24 comprises a range estimator 44 for estimating radar range data of an object (if any) in a field of view and an angular monitor 46 for measuring and archiving angular position data (e.g., azimuths) of a radar transmission (e.g., pulse) or beam transmitted from the radar system 18. The radar system 18 corhmunicates radar observed data (e.g., radar range data and corresponding angular position data) to the radar occupancy grid formation module 30 or the data processing system 26.

In the data processing system 26, the laser occupancy grid formation module 28 and the radar occupancy grid formation module 30 communicate with the evaluator 32. In turn, the evaluator 32 communicates with a definer 34. For example, the evaluator 32 sends a composite evidence grid to the definer 34. The define may generate an object representation based on the composite evidence grid. The characterization module 40 may classify the object based on the object representation. For example, the characterization module 40 may define a group of classifications for objects and determine if an object is a member of one or more classifications. In one embodiment, a user may define the classifications based on specifications, characteristics, and dimensions for timber, lumber, or wood, for instance.

The laser observed data comprises one or more of the following: (1) laser range data associated with an object and corresponding angular orientation data, (2) signal quality data associated with corresponding pairs of laser range data and angular orientation data, (3) object location data (e.g., in a generally horizontal plane, a generally vertical plane or in three-dimensions) as observed by the laser system 10, (4) a signal quality level or signal quality estimate corresponding to the object location data, and (5) scanned area data of the area scanned by the laser system 10 (e.g., where no objects are present or detected by the receipt of a reflection by the laser system 10) or scanned volume data of the volume scanned by the laser system 10. The object location data may be defined in terms of one or more of the following: an estimated range from the laser system 10 to the object, an angular orientation of the transmitted laser transmission with respect to the laser system 10 or a reference coordinate system (e.g., Cartesian or polar coordinates); and a cell identifier associated with a physical cell in the field of view of the laser system 10. The scanned area data or scanned volume data may be defined in terms of one or more of the following: the absence of a received reflection at an estimated range and angular orientation.

The radar observed data comprises one or more of the following: (1) radar range data associated with an object and corresponding angular orientation data, (2) signal quality data associated with corresponding pairs of radar range data and angular orientation data, (3) object location data as observed by the radar system 18, (4) a signal quality level or signal quality estimate corresponding to the object location data, and (5) scanned area data of the area scanned by the radar system 18 (e.g., where no objects are present or detected by the receipt of a reflection by the radar system 18) or scanned volume data of the volume scanned by the radar system 18. The object location data may be defined in terms of one or more of the following: an estimated range from the radar system 18 to the object, an angular orientation of the transmitted radar transmission with respect to the radar system 18 or a reference coordinate system (e.g., Cartesian or polar coordinates); and a cell identifier associated with a physical cell in the field of view of the radar system 18. The scanned area data or scanned volume data may be defined in terms of one or more of the following: the absence of a received reflection at an estimated range and angular orientation.

The laser occupancy grid formation module 28 inputs, receives, or accesses laser observed data. The laser occupancy grid formation module 28 processes the inputted laser observed data to provide a laser occupancy grid. The formation of the laser occupancy grid is discussed in greater detail in conjunction with the methods of FIG. 2 through FIG. 4, inclusive. The radar occupancy grid formation module 30 inputs, receives, or accesses radar observed data. The radar occupancy grid formation module 30 processes the inputted radar observed data to provide a radar occupancy grid. The formation of the radar occupancy grid is discussed in greater detail in conjunction with the methods of FIG. 2 through FIG. 4, inclusive. In one embodiment, a data processing system 26 processes the determined laser location data to form a laser occupancy grid for the first zone and processes the determined radar location data to form a radar occupancy grid for the second zone. The processing capacity or capability of the data processing system 26 and memory may determine an upperbound limit for the size of the laser occupancy grid, the radar occupancy grid, the composite evidence grid, the augmented evidence grid. The size of any occupancy grid or evidence grid herein may be defined in terms of the number of cells within any occupancy grid or evidence grid described herein, or the maximum resolution of any occupancy grid or evidence grid described herein.

The evaluator 32 inputs, receives or accesses the laser occupancy grid and the radar occupancy grid formed by the laser occupancy grid formation module 28 and the radar occupancy grid formation module 30, respectively. The evaluator 32 processes the laser occupancy grid and the radar occupancy grid to form or derive a composite evidence grid.

In one embodiment, the evaluator 32 evaluates the radar occupancy grid and the laser occupancy grid to produce a composite evidence grid for at least an overlapping region defined by the first zone and the second zone. The radar system 18 may have radar limitations because of any of the following: (a) range and angular resolution anomalies in the radar location data because of antenna pattern characteristics, such as side lobes, and (b) limitations in field of view (e.g., up to 45 degrees) because of antenna limitations. The laser system 10 has laser limitations because of degraded laser location data because of precipitation, whether, fog, and rain. The composite evidence grid overcomes the radar limitations and laser limitations by incorporating the dual frequency ranges of the laser system 10 and the radar system 18. Accordingly, the strengths of the laser system 10 compliment the weakness of the radar system 18, and vice versa to provide a quality representation of objects in overlapping region (e.g., overlapping of the first zone and the second zone) of the field of view.

In the non-overlapping field of view, the evaluator 32 may use the sensor data (e.g., radar system 18 or laser system 10) that has the widest field of view. For example, the evaluator 32 may use laser location data for the non-overlapping region, where the laser system 10 (e.g., up to 180 degrees field of view) has a greater field of view than the radar system 18 (e.g., up to 45 degrees field of view typical).

The definer 34 comprises a boundary definition module 36 for estimating a boundary or edge of the object (or objects) and a dimension estimator 38 for estimating a real world dimension associated with the object (or objects). The definer 34 defines an object representation for the object in the first zone and the object in the second zone. In one example, a definer 34 defines an object representation for the object in the first zone and the object in the second zone, where the object represents a single object. In another example, a definer 34 defines an object representation for the object in the first zone and the object in the second zone, where the object represents two different objects. The object representation may comprise a two-dimensional representation or a three-dimensional representation. The object representation may be defined in image space from the laser observed data or scaled to real world measurements and locations, for example.

A dimension estimator 38 estimates the dimensions (e.g., real world dimensions) of the wood and wood portions to be extracted from the object. The laser system 10, the radar system 18, and the data processing system 26 cooperate to characterize harvestable timber, undesirable forest obstacles, and other objects by creating composite representations (e.g., two dimensional, three dimensional, or partial three dimensional) of the objects. For example, the representation of harvestable timber or a tree (e.g., a cut or fallen tree) may describe attributes including one or more of the following: trunk length, trunk diameter, maximum trunk diameter, minimum trunk diameter, trunk slope, conical or cylindrical trunk model, branch location with respect to the trunk, branch diameter, maximum branch diameter, minimum branch diameter, branch length, stem attributes, lengths, heights, shapes, and volumes of tree portions.

The characterization module 40 may comprise an object classifier 42 that does one or more of the following: (1) classifies objects (e.g., timber, trees, or tree portions) by volume ranges, (2) classifies objects by maximum corresponding dimension ranges (e.g., trunk lengths and trunk diameters; limb lengths and limb diameters), (3) distinguishes a trunk from limbs of a tree or harvested tree by comparing dimension estimates to dimensional profiles, and (4) characterizes the object as a trunk, a limb, or another tree portion based on the defined object representation.

Figure 2:
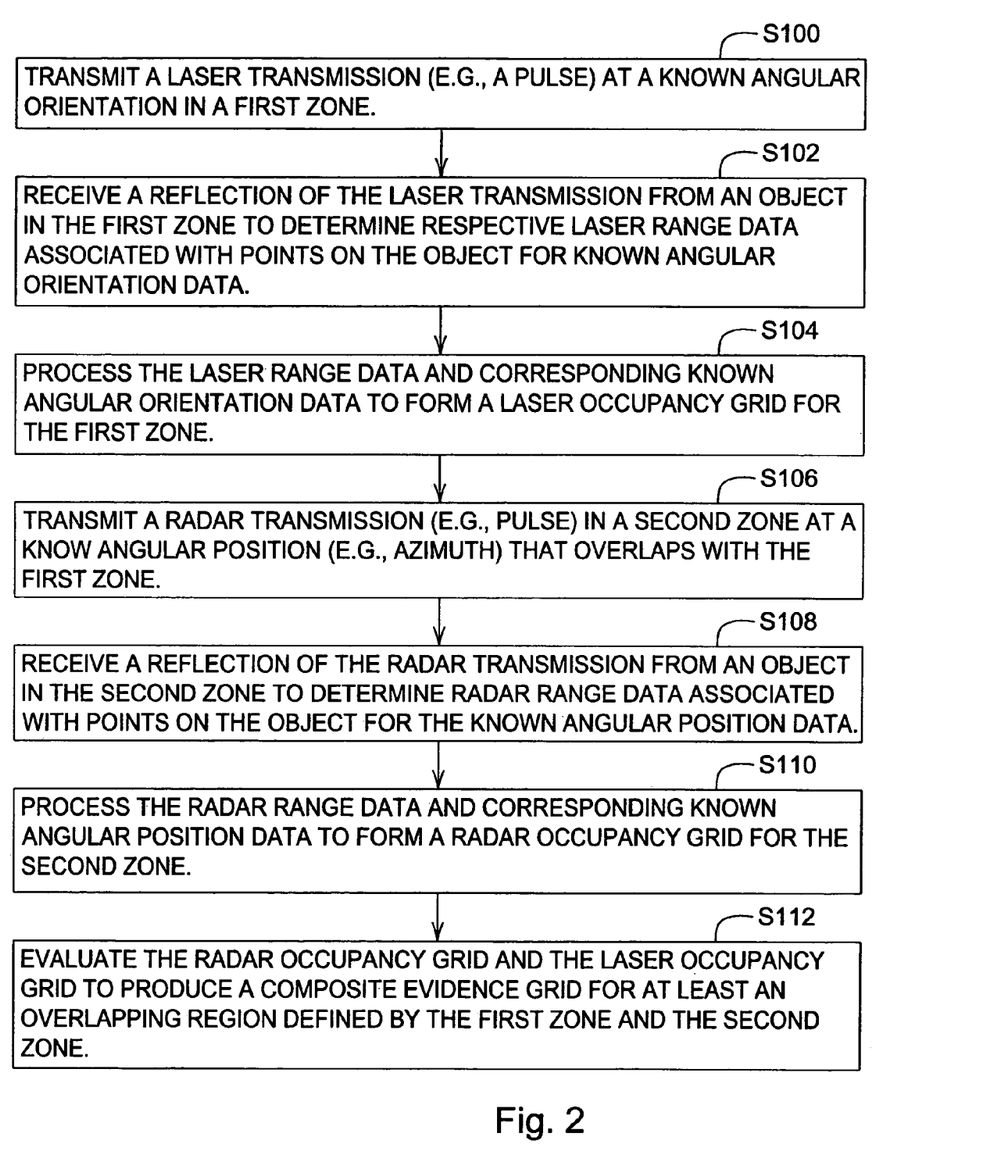
FIG. 2 is a first example of a method for detecting or characterizing an object associated with the vehicle.

FIG. 2 illustrates a method for characterizing an object. The method of FIG. 2 begins with step S100.

In step S100, a source 12 transmits a laser transmission (e.g., one or more identifiable pulses) at a corresponding known angular orientation in a first zone. For example, the source 12 transmits a laser transmission in a first frequency range over different known angular orientations (e.g., azimuth and elevation; or azimuth, elevation, and tilt) to cover a first zone of a work area. The laser transmission may comprise a pulse or modulated pulse (e.g., pulse-width modulated signal) of electromagnetic radiation in a first frequency range or a first wavelength range. In one embodiment the first frequency range comprises one or more of the following ranges: visible light, infra-red light, near infra-red light, ultraviolet light, and other frequencies of light.

In step S102, to the extent that an object is present in the first zone, a detector 14 receives a reflection of the laser transmission from an object in the first zone to determine laser range data associated with points on or lying on the surface of the object for known angular orientation data. The detector 14 may be associated with a timer or a clock for measuring an elapsed time of propagation between the transmission of a laser transmission (e.g., identifiable pulse) and a reception of the reflection of the laser transmission from the object. The time of propagation or "time of flight" is converted into a range, which refers to the distance between the laser system 10 and the object. Further, each corresponding range data is associated with respective angular orientation data of each particular transmission.

The spatial volume or scanned volume (e.g., first zone) around the laser system 10 may be divided into a group of cells in a generally horizontal plane, a generally vertical plane, or in a three-dimensional representation of the field of view. Each cell in the first zone or the field of view may be defined in terms of a particular range (or limits) of angular orientations and a corresponding particular range (or limits) of laser range data. The laser system 10 may not provide a reflection for a particular cell within the field of view or scanned volume, unless an object is present in the particular cell in the field of view or scanned volume.

In one embodiment, step S102 includes determining the signal quality of the reflection for each corresponding pair of angular orientation data and corresponding laser range data. The observed laser data may comprise one or more of the following: angular orientations of the transmission of the laser transmission, estimated ranges from the received reflection of the laser transmission, cell identifiers associated with angular orientations and corresponding ranges, and signal quality indicators and associated cell identifiers.

In step S104, a first data processor 16 processes the determined laser observed data to form a laser occupancy grid for the first zone. A cell of the laser occupancy grid represents a definable volume or area defined in the scanned volume or field of view of the laser system 10. Each cell is associated with location data, coordinates or ranges of location data. For example, the boundaries of each cell may be defined by location data. The location data of each cell may be described by (a) angular orientation data (e.g., azimuth angle and elevation angle; or azimuth angle, elevation angle, and tilt angle) and a laser range data or (b) by a range (or set) of angular orientation data and by a range (or set) of laser range data. Each cell may be identified by a cell identifier, which may support referencing of cellular location data.

The laser occupancy formation module 28 or data processing system 26 populates each cell of the laser occupancy grid with a corresponding probability associated with a possible state (e.g., cell empty, object present in cell) of the cell. In one embodiment, the probability for a particular cell is derived from the a signal quality indicator associated with the particular cell. In one example, the laser occupancy grid is a two-dimensional grid containing a probability with a range from 0 to 1 that the grid is occupied by an object. In another example, the laser occupancy grid is a three-dimensional grid containing a probability with a range from 0 to 1 that the grid is occupied by an object.

The data processing system 26 interprets the laser observed data from the laser system 10. The data processing system 26 determines the probability that the laser observed data results from an object. For example, the probability may be based on the signal quality level of the reflection meeting or exceeding a signal quality standard. The signal quality level may be based on one or more of the following: signal strength, bit error rate, a symbol error rate, an error rate a decodable modulated code in the reflection, a pulse duration of the reflection. The cell occupancy probability is determined and stored for each cell in the laser occupancy grid for a corresponding observation, sample, sensing cycle, or measurement interval.

Under one procedure for carrying out step S104, the occupancy probability for each cell in the laser occupancy probability grid is updated recursively using a filtering technique (e.g., a Bayes filter technique). The filtering may remove anomalous or spurious laser observed data and radar observed data from consideration by the evaluator 32, definer 34, and characterization module 40. The filter (e.g., Bayes filter) provides a probability that a particular cell within the laser occupancy grid is in a given state (e.g., occupied by an object or empty). For example, the Bayes filter may determine the probability for the laser occupancy grid in accordance with the following equation:

$$p\langle l_{i,j}|m_t,\ldots,m_1\rangle = \frac{p\langle m_t|l_{i,j}\rangle p\langle l_{i,j}|m_{t-1},\ldots,m_0\rangle}{p(m_t)}, \text{ where } p\langle l_{i,j}|m_t,\ldots,m_1\rangle$$

is the probability that cell (i,j) is in a state l (e.g., occupied, empty, or unknown) over a time frame representing a group of samples (e.g., measurements of reflections of the transmitted laser transmissions) at corresponding times $m_1$ through $m_t$, where $p\langle m_t|l_{i,j}\rangle$ is the probability of obtaining the sample $m_t$, given that the cell (i,j) is in the state $l_{i,j}$, where $p\langle l_{i,j}|m_{t-1},\ldots,m_0\rangle$ is the probability of observing the cell (i,j) in state over the time frame representing a group of samples from $m_{t-1}$ until $m_o$, and where $p(m_t)$ is a normalization factor or the probability of obtaining the sample at time $m_t$.

In step S106, a transmitter 20 transmits a radar transmission in a second zone that overlaps with the first zone. For example, the transmitter 20 transmits a radar transmission in a second frequency range over different known angular positions (e.g., azimuth and elevation; or azimuth elevation, and tilt) to cover a second zone of a work area. The radar transmission may comprise a pulse or modulated pulse (e.g., pulse-width modulated signal) of electromagnetic radiation in a second frequency range, which is distinct from the first frequency range. In one embodiment the second frequency range comprises any signal within a microwave band within any portion of the spectrum from approximately 1 GHz to 100 GHz.

In step S108, a receiver 22 receives a reflection of the radar transmission from an object in the second zone to determine radar observed data associated with points on the object for the known angular position data. The receiver 22 may be associated with a timer or a clock for measuring an elapsed time of propagation between transmission of a radar transmission (e.g., identifiable pulse) and a reception of the reflection of the radar transmission from the object The time of propagation or "time of flight" is converted into a range, which refers to the distance between the radar system 18 and the object further, each corresponding range is associated with a respective angular orientation of each particular transmission.

Each cell in the second zone or the field of view may be defined in terms of a particular range of angular orientations and a corresponding particular spectrum of ranges between the radar system 18 and the object. The radar system 18 may not provide a reflection for a particular cell within the field of view or scanned volume, unless an object is present in the particular cell in the field of view or scanned volume.

In one embodiment, step S108 includes determining the signal quality of the reflection for each corresponding pair of angular orientation and corresponding range. The observed radar data may comprise one or more of the following: angular orientations of the transmission of the radar transmission, estimated ranges from the received reflection of the radar transmission, cell identifiers associated with angular orientations and corresponding ranges, and signal quality indicators and associated cell identifiers.

In step S110, a second data processor 24 processes the determined radar observed data to form a radar occupancy grid for the second zone. A cell of the radar occupancy grid represents a definable volume or area defined in the scanned volume or field of view of the radar system 18. Each cell is associated with location data, coordinates or ranges of location data. For example, the boundaries of each cell may be defined by location data. The location data of each cell may be described by (a) angular orientation data e.g., azimuth angle and elevation angle; or azimuth angle, elevation angle, and tilt angle) and a radar range data or (b) by a range (or set) of angular orientation data and by a range (or set) of radar range data. Each cell may be identified by a cell identifier, which may support referencing of cellular location data.

The radar occupancy formation module 30 or data processing system 26 populates each cell of the radar occupancy grid with a corresponding probability associated with a possible state (e.g., cell empty, object present in cell) of the cell. In one embodiment, the probability for a particular cell is derived from the a signal quality indicator associated with the particular cell. In one example, the radar occupancy grid is a two-dimensional grid containing a probability with a range from 0 to 1 that the grid is occupied by an object. In another example, the radar occupancy grid is a three-dimensional grid containing a probability with a range from 0 to 1 that the grid is occupied by an object.

The radar occupancy grid formation module 30 or the data processing system 26 interprets the radar observed data from the radar system 18. The data processing system 26 determines the probability that the radar observed data results from an object. For example, the probability may be based on the signal quality level of the reflection of the radar transmission meeting or exceeding a signal quality standard. The signal quality level may be based on one or more of the following: signal strength, bit error rate, a symbol error rate, an error rate a decodable modulated code in the reflection, a pulse duration of the reflection. The cell occupancy probability is determined and stored for each cell in the radar occupancy grid for a corresponding observation, sample, sensing cycle, or measurement interval.

In one embodiment, the occupancy probability for each cell in the radar occupancy probability grid is updated recursively using a filtering technique (e.g., a Bayes filter technique). The filtering may remove anomalous or spurious laser observed data and radar observed data from consideration by the evaluator 32, definer 34, and characterization module 40. The filter (e.g., Bayes filter) provides a probability that a cell within the radar occupancy grid is in a given state (e.g., occupied by an object or empty). For example, the Bayes filter may determine the probability for the radar occupancy grid in accordance with the following equation:

$$p\langle r_{i,j}|m_t,\ldots,m_1\rangle = \frac{p\langle m_t|r_{i,j}\rangle p\langle r_{i,j}|m_{t-1},\ldots,m_0\rangle}{p(m_t)}, \text{ where } p\langle r_{i,j}|m_t,\ldots,m_1\rangle$$

is the probability that cell (i,j) is in a state r (.e.g., occupied empty or unknown) over a time frame representing a group of samples at corresponding times $m_1$ through $m_t$, where $p\langle m_t|r_{i,j}\rangle$ is the probability of obtaining the sample $m_t$, given that the cell (i,j) is in the state $r_{i,j}$, where $p\langle r_{i,j}|m_{t-1},\ldots,m_0\rangle$ is the probability of observing the cell (i,j) in state over the time frame representing a group of samples from $m_{t-1}$ until $m_o$, and where $p(m_t)$ is a normalization factor or the probability of obtaining the sample at time $m_t$.

In step S112, an evaluator 32 evaluates the radar occupancy grid and the laser occupancy grid to produce a composite evidence grid for at least an overlapping region defined by the first zone and the second zone. The evidence grid can be two dimensional or three dimensional representation of the sensed volume or field of view that includes objects within the sensed volume. The evidence grid may be modeled as a series of cells, which may be squares for a two dimensional grid and cubes for a three dimensional grid. The dimensions of each cell may be based on the resolution limits of the laser system 10, the radar system 18, or both, the minimum resolution required to model the object, and the real-time processing capacity of the data processing system 26. The resolution may be selected to be sub-millimeter, sub-centimeter, or sub-meter, in general terms.

Each evidence cell may be assigned a binary number or symbol that indicates the probability of occupancy (or if desired the probability of vacancy for a highly cluttered environment). The evidence cell may contain evidence data indicative of the presence or absence of data from the sensed object. If the evidence data (e.g., binary data) in the evidence cells are spatially combined, an object representation results that can be used for object characterization. The resolution for the laser system 10 and the radar system 18 may differ from one another, such that the laser occupancy grid needs to be mapped, scaled, or adjusted spatially or temporally with respect to the radar occupancy grid for formation of the evidence grid.

In one embodiment, the evidence grid is constructed by first applying corresponding cells of the laser occupancy probability grid and the radar occupancy grid to a filtering technique (e.g., a Bayes filter technique). Second, the filtered composite occupancy probability grid is converted to a composite evidence grid. For example, the probability levels from 0 to 1 are converted into evidence data, where the evidence data may be in two or more allowable states. A cell in the evidence grid is assigned one corresponding state or evidence data value from the allowable states. In one example the allowable states include the cell is occupied and the cell is empty. In another example the allowable states include the cell is occupied, the cell is empty, and unknown as to whether the cell is occupied or empty.

The filtering may remove anomalous or spurious laser observed data and radar observed data from consideration by the evaluator 32, definer 34, and characterization module 40. For example, the composite occupancy grid or precursor to the composite evidence grid is determined by the following equation:

$$p \langle c_{i,j} | l_{i,j}, r_{i,j} \rangle = \frac{p(c_{i,j}) p(l_{i,j}, r_{i,j} | c_{i,j})}{p(l_{i,j}, r_{i,j})}, \text{ where } p \langle c_{i,j} | l_{i,j}, r_{i,j} \rangle$$

is the probability that cell (i,j) of the composite occupancy grid is in a state c (e.g., occupied empty or unknown) given the laser probability grid is in state $l_{i,j}$ and given the radar occupancy grid is in state $r_{i,j}$, where p<$c_{i,j}$> is the probability of obtaining that cell (i,j) is in the state $c_{i,j}$, where p($l_{i,j}, r_{i,j} | c_{i,j}$ is the probability of observing the cell (i,j) of the laser occupancy grid in state l and of the radar probability grid in state r, given that the composite occupancy grid is in state c, and where p($l_{i,j}, r_{i,j}$) is the probability of obtaining the entries in cell (i,j) of the laser occupancy grid in state l and of the radar occupancy grid in state r.

The laser observed data may contain degradations in laser observed data from weather, rain, or precipitation, which may be indicated by laser signal quality estimates. The radar observed data may contain antenna side lobes or multipath reflections (e.g., reflections from other objects in the environment of the object of interest), which may be indicated by the radar signal quality estimates. Where the laser observed data and the radar observed data reinforce each other for a given cell, the collective dual frequency coverage of the laser system 10 and radar system 18 reflects a higher probability of occupancy for a given cell. Where the laser observed data and the radar observed data do not reinforce with each other for a given cell, the collective dual frequency coverage of the laser system 10 and radar system 18 reflects a lower probability of occupancy for a given cell. Accordingly, the reinforcement or substantially similarity of range and angular orientation values for a given cell allows for a cross-check, comparison, or benchmark check of the integrity or reliability of the radar observed data and the laser observed data.

Although the steps of the method of FIG. 2 appear in a certain order for illustrative purposes, the method of FIG. 2 may execute steps simultaneously or in different orders than shown. For example, steps S100, S102, and S104 may be executed prior to, during, or after steps S106, S108, and S110. Further, the method may employ simultaneous processing, parallel processing, or processing of the steps in any technically feasible order.

Figure 3:
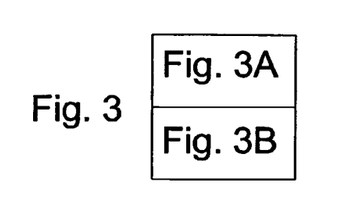
FIG. 3A and FIG. 3B, which collectively are designated as FIG. 3, represent a second example of a method for detecting or characterizing an object.
Figure 3A:
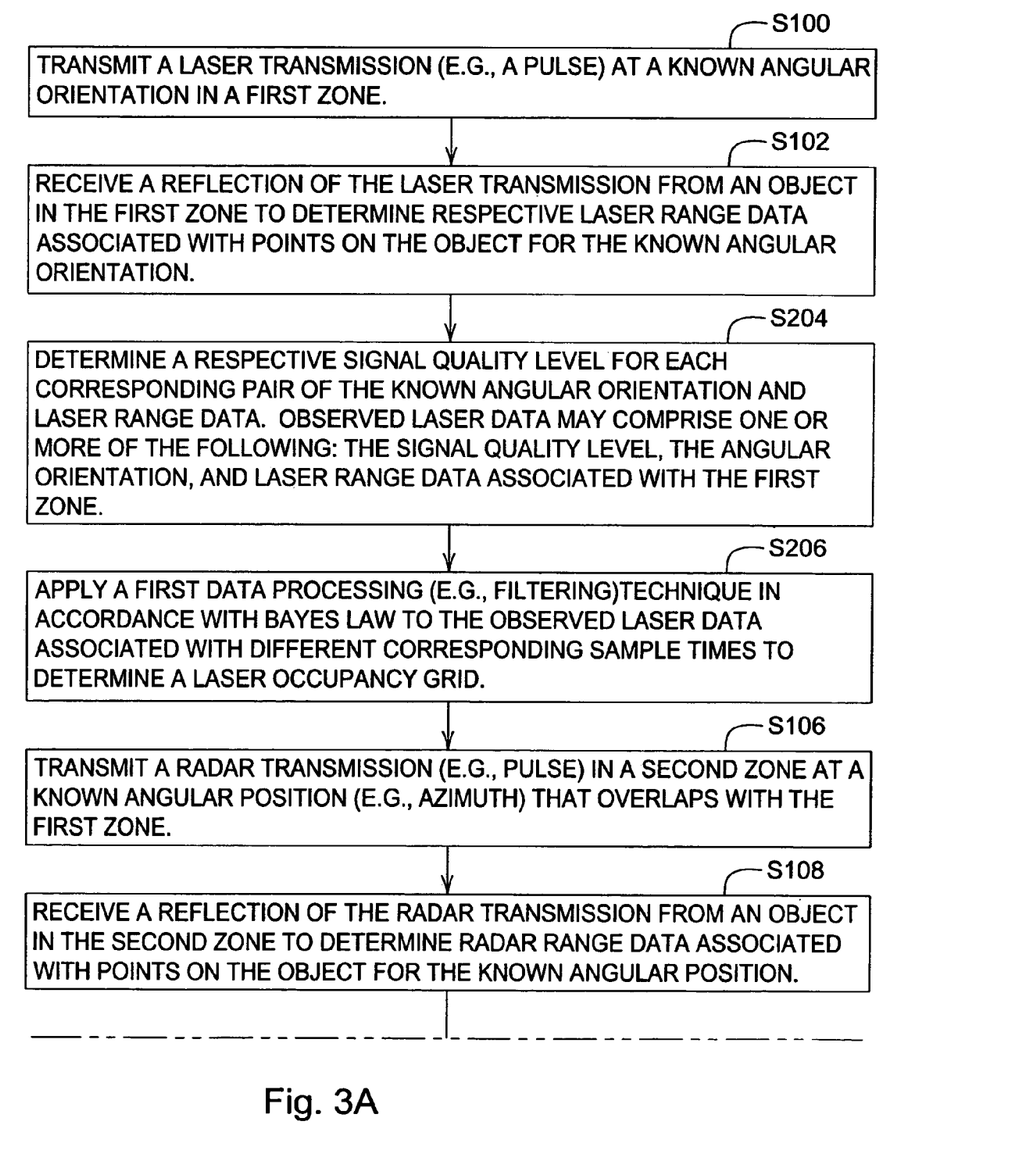
Figure 3B:
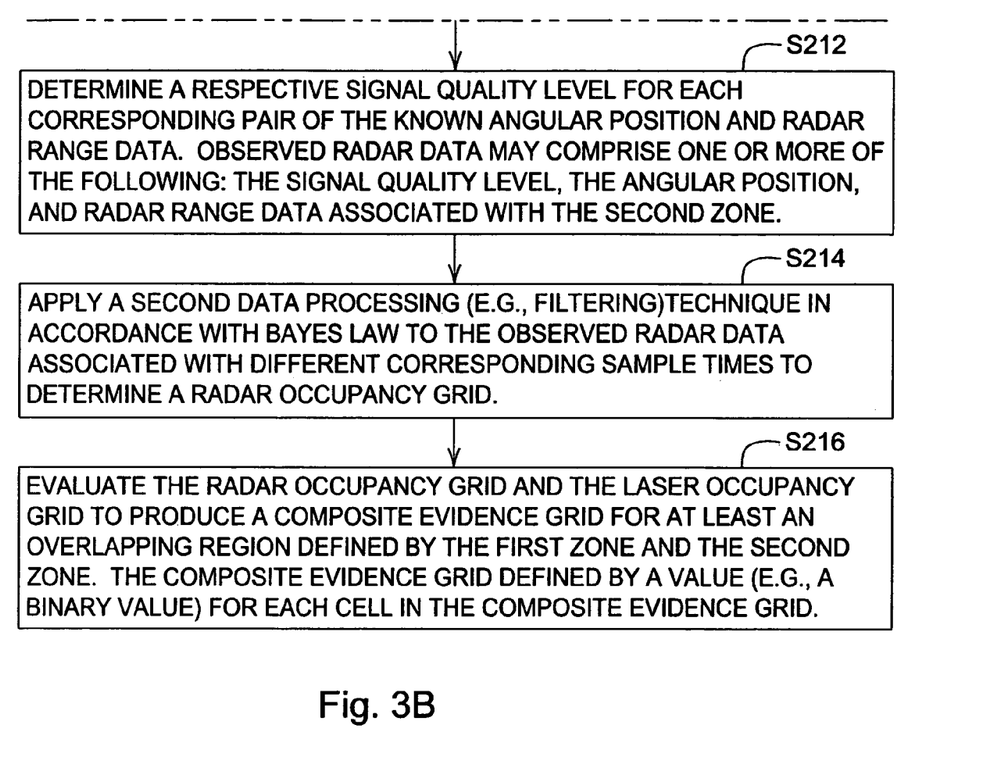

FIG. 3, which includes FIG. 3A and FIG. 3B collectively, illustrates a method for detecting or characterizing an object. The method of FIG. 3 has some steps in common with the method of FIG. 2. Like steps or procedures in FIG. 2 and FIG. 3 are indicated by like reference numbers.

In step S100, a source 12 transmits a laser transmission (e.g., a pulse) at a known angular orientation (e.g., azimuth, elevation, and tilt) in a first zone.

In step S102, a detector 14 receives a reflection of the laser transmission from an object in the first zone. A first data processor 16 determines laser observed data associated with the points on the object. For example, the first data processor 16 determines a range of the object through the elapsed time of propagation between transmission of the laser transmission and reception of any reflection from an object in the first zone.

In step S204, a data processing system 26 determines a signal quality levels for corresponding pairs of angular orientations and laser ranges. For example, a signal quality level is assigned to cells in the first zone that are associated with an object in the cell. The signal quality level definition associated with the description of FIG. 2 applies equally to FIG. 3. Observed laser data may comprise one or more of the following: the signal quality level, the angular orientation, and laser range data associated with the first zone.

In step S206, the data processing system 26 or the laser occupancy grid formation module 28 applies a first data processing (e.g., filtering) technique in accordance with Bayes law to the observed laser data associated with different corresponding sample times to determine a laser occupancy grid. For example, the data processing system 26 may determine probabilities that a cell is occupied by an object based on the signal quality levels of step S204.

In step S106, a transmitter 20 transmits a radar transmission (e.g., an identifiable pulse) at a known angular position (e.g., azimuth) in a second zone that overlaps with the first zone.

In step S108, a receiver 22 receives a reflection (e.g., the identifiable pulse) of the radar transmission from an object in the second zone to determine radar observed data (e.g., range data) associated with points on the object for the known angular position.

In step S212, a data processing system 26 determines a signal quality levels for corresponding pairs of angular orientations and ranges. For example, a signal quality level is assigned to cells in the second zone that are associated with an object in the cell. Observed radar data may comprise one or more of the following: the signal quality level, the angular position, and radar range data associated with the second zone.

In step S214, the data processing system 26 or radar occupancy grid formation module 30 applies a second data processing (e.g., filtering) technique in accordance with Bayes law to radar occupancy grids associated with different corresponding sample times to determine a radar occupancy grid.

In step S216, an evaluator 32 evaluates the radar occupancy grid and the laser occupancy grid to produce a composite evidence grid for at least an overlapping region of the first zone and the second zone. For example, the evaluator 32 may apply a third data processing technique (e.g., a filtering technique) in accordance with Bayes law with respect to the laser occupancy grid and the radar occupancy grid to form a composite evidence grid defined by evidence data (e.g., binary value) for each cell in the composite evidence grid. The composite evidence grid may be defined by a binary value for each cell in the composite evidence grid, where, one binary value indicates that an object is present in a corresponding cell, whereas the opposite binary value indicates that an object is absent in a particular corresponding cell.

Step S216 may be followed by additional supplemental steps. In a first example, a definer 34 defines an object representation (e.g., a two dimensional or three dimensional representation) for the object in the first zone and the object in the second zone. The object in the first zone and the second zone may represent the same object if the object falls within the overlapping region of the first zone and the second zone. However, if the object does not fall within the overlapping region of the first zone and the second zone, the object likely represents two distinct objects.

In a second example, the boundary definition module 36 defines a boundary of the object by identifying a transition between values of the cells of the evidence grid. In an evidence grid or composite evidence grid, an object generally may be characterized by a cluster or adjoining cells that indicate that an object is present. Once the boundary of the object is defined, a dimension estimator 38 may be applied to estimate a maximum dimension of the object or other dimensions of the object. An object representation may be defined by the boundary of the object and its dimensions.

In a third example, which builds upon and incorporates the second example, the object representation may be forwarded to the characterization module 40. The characterization module 40 comprises an object classifier 42 that characterizes the object as a trunk, a limb, or another tree portion based on the defined object representation. Further, the object classifier 42 estimates the dimensions of the wood and wood portions to be extracted from the object. The classifier 42 may compare the object representation to reference profiles or reference object representations. The reference profiles or reference object representations may contain parameters or characteristics for a class of objects (e.g., wood, tree portions, lumber, timber).

Figure 4:
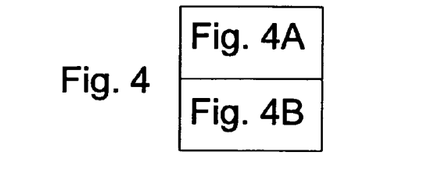
FIG. 4A and FIG. 4B, which collectively are designated as FIG. 4, represent a third example of a method for detecting or characterizing an object.
Figure 4A:
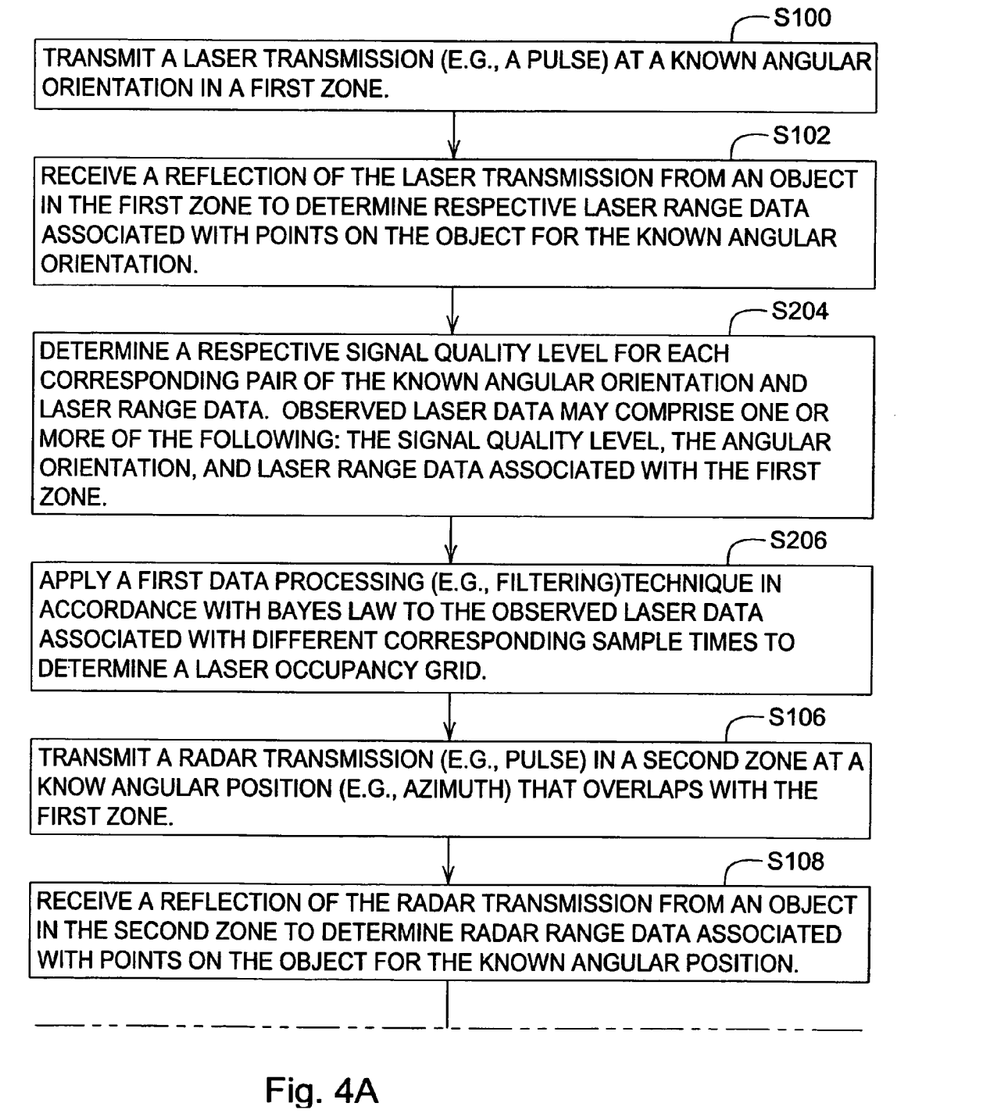
Figure 4B:
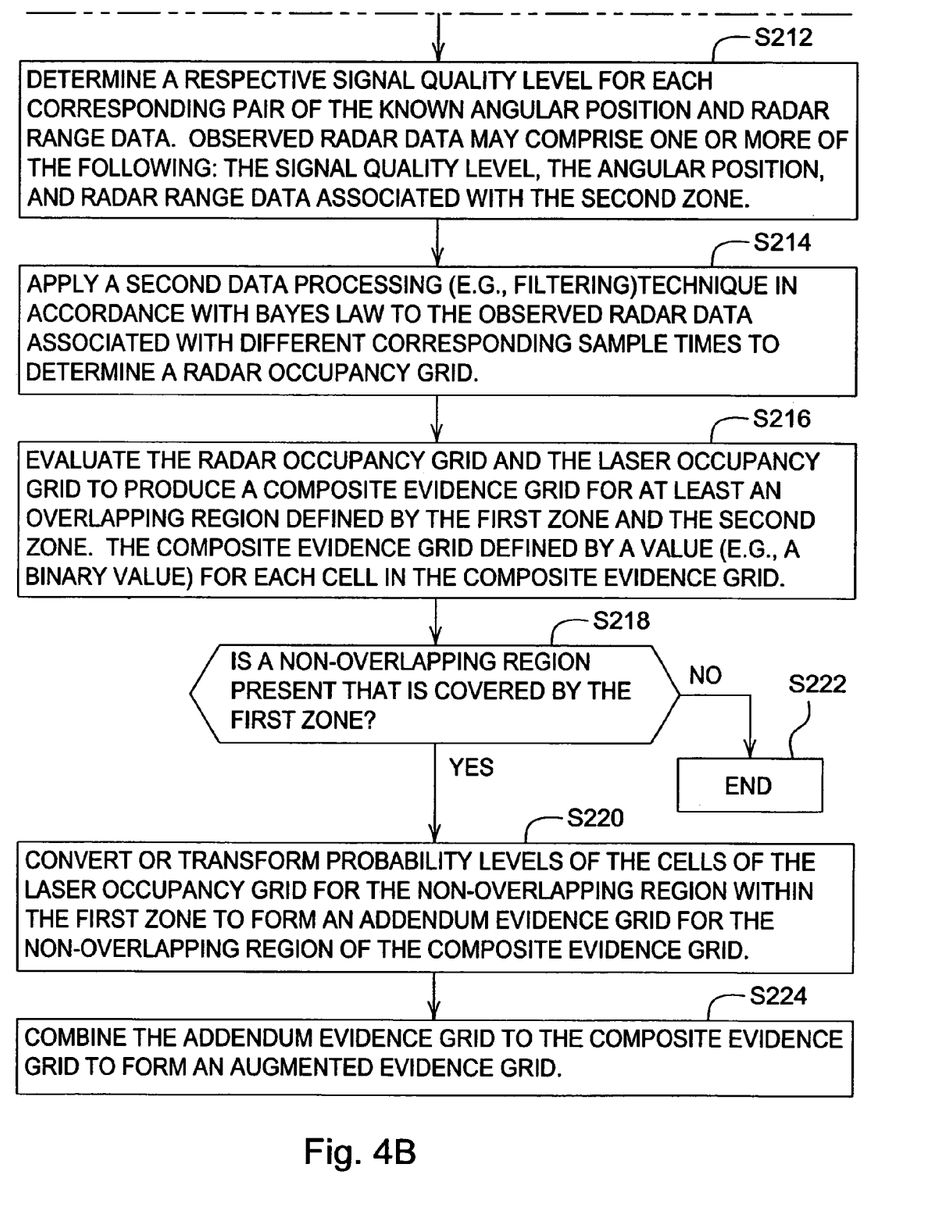

The method of FIG. 4 is similar to the method of FIG. 3, except additional steps are added to form an augmented composite evidence grid, as opposed to a composite evidence grid. Like reference numbers in FIG. 3 and FIG. 4 indicate like steps or procedures. FIG. 4 includes FIG. 4A and FIG. 4B collectively.

The descriptions of the steps appearing in both FIG. 3 and FIG. 4 are set forth in conjunction with FIG. 3. Following step S216, step S218 begins.

In step S218, it is determined whether a non-overlapping region is present that is covered by the first zone. If a non-overlapping region is present, then the method continues with step S220. If a non-overlapping region is not present, then the method ends in step S222.

In step S220, the data processing system 26 converts or transforms the probability levels of the cells of the laser occupancy grid if the non-overlapping region is covered by the first zone. The data processing system 26 converts the non-overlapping region of the laser occupancy grid into an evidence grid for the non-overlapping region of the composite evidence grid.

To execute step S220, each probability level of the laser occupancy grid is associated with a set of possible values (e.g., binary values). The probability levels are divided into two or more ranges, and a state value is associated with each corresponding range. In one example, the probability levels are divided into two or more ranges, where every probability below a threshold is assigned one binary value (e.g., 0) and every probability above a threshold is assigned another binary value (e.g., 1). In another example, the probability levels may be divided into three ranges: a lower range, a middle range, and an upper range. Further, the upper range is associated with a value that indicates the presence of an object in a cell; the lower range is associated with a value that indicates the absence of an object in a cell; and the medium range is inconclusive as to whether there is an object present or absent in the cell.

In step S224, following step S220, the data processing system 26 combines the addendum evidence grid to the composite evidence grid to form an augmented evidence grid. Accordingly, the augmented evidence grid realizes the benefit of Bayes filtering and the full field of view of the laser system 10 to provide a robust, reliable scheme for detection and characterization of an object.

Figure 5:
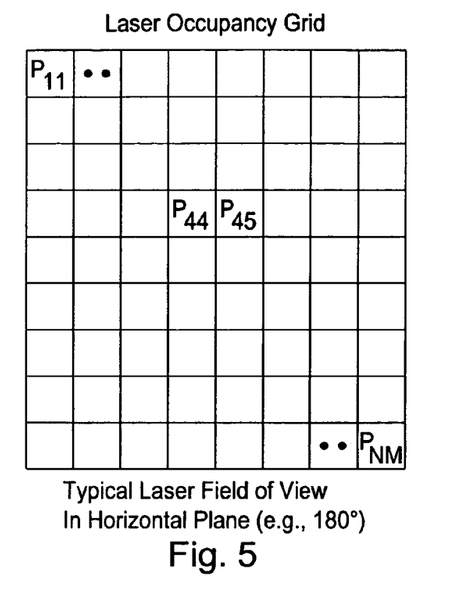
FIG. 5 is a laser occupancy grid that shows probability levels for corresponding cells in a generally horizontal plane where an object is present in a central region of the occupancy grid.

FIG. 5 is a laser occupancy grid that shows probability levels for corresponding cells where an object is present in a central region of the occupancy grid. Each cell is associated with a corresponding probability of a cell state (e.g., cell occupied, cell empty, or unknown). The cells range from a first cell (1,1) with probability level $P_{11}$ in the upper left corner of the laser occupancy grid to the N×M th cell in the Nth row and Mth column. The last cell (N, M) with a probability level of $P_{NM}$, where N is maximum number of rows and M is the maximum number of columns. The maximum number of rows and columns depend upon the desired resolution of the laser occupancy grid and field of view of the laser system 10, among other factors.

Here, two central cells are shown with corresponding probabilities $P_{4,4}$, and $P_{4,5}$, which indicate that an object (e.g., a tree portion) is present in those two cells. Although the laser occupancy grid may have any feasible field of view, in practice, the field of view of the laser system 10 may define the field of view as approximately one hundred and eighty degrees (180) or less with respect to the laser system 10.

Figure 6:
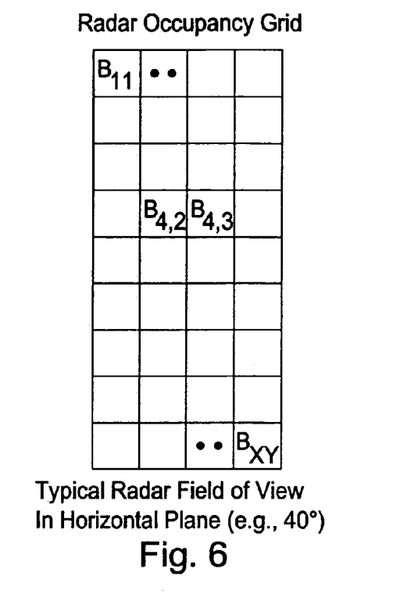
FIG. 6 is a radar occupancy grid that shows probability levels for corresponding cells in a generally horizontal plane where an object is present in a central region of the occupancy grid.

FIG. 6 is a radar occupancy grid that shows probability levels for corresponding cells where an object is present in a central region of the occupancy grid. Each cell is associated with a corresponding probability of a cell state (e.g., cell occupied, cell empty, or unknown). The cells range from a first cell (1,1) with probability $B_{11}$ in the upper left corner of the radar occupancy grid to the Y×X th cell in the Yth row and Xth column. The last cell (X,Y) with probability $B_{XY}$, is where X is the maximum number of rows and Y is the maximum number of columns. The maximum number of rows and columns depend upon the desired resolution of the radar occupancy grid, among other factors.

Here, two central cells are shown with corresponding probabilities $B_{4,2}$, and $B_{4,3}$, which indicate that an object (e.g., a tree portion) is present in the cells. Although the radar occupancy grid may have any feasible field of view, in practice, the field of view of the radar system 18 may define the field of view as approximately forty-five (45) degrees or less with respect to the laser system 10.

Figure 7:
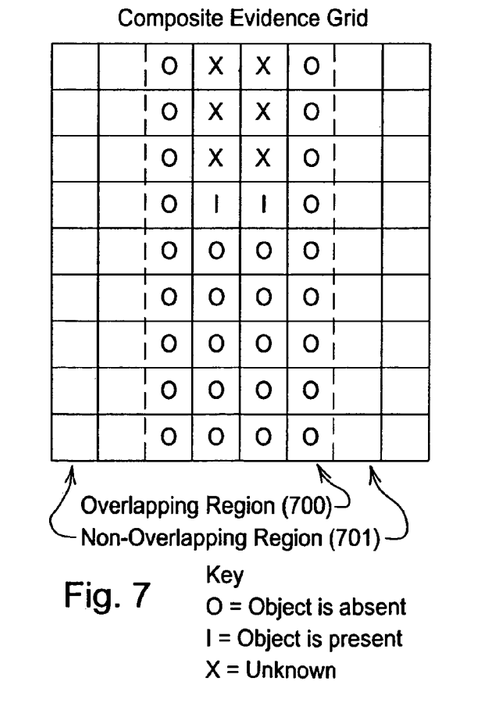
FIG. 7 is a composite evidence grid that comprises an overlapping region and a non-overlapping region based on the occupancy grids of FIG. 5 and FIG. 6.

FIG. 7 is a composite evidence grid that comprises an overlapping region 700 and a non-overlapping region 701 based on the occupancy grids of FIG. 5 and FIG. 6. The overlapping region 700 represents an overlapping area of the laser occupancy grid and the radar occupancy grid, after alignment or registering of the laser occupancy grid with the radar occupancy grid. The overlapping region 700 has one of three possible values for each cell. The object is absent is indicated by a 0; the object is present is indicated by a 1, and the present or absence of the object is unknown is indicated by an X.

Although the border between the overlapping region 700 and the non-overlapping region 701 is generally linear as indicated by the dashed vertical line, the border may have virtually any continuous shape, regardless of whether it is linear or curved.

The evidence grid is formed from the laser occupancy grid and radar occupancy grid according to a three stage process. In the first stage, the laser occupancy grid and the radar occupancy grid are registered or aligned in a spatial and temporal manner. For example, if it is assumed that the cells of FIG. 5 and FIG. 6 are substantially uniform in size, cell (1,1) of the radar occupancy grid of FIG. 6 is spatially coextensive with the cell (1,3) of the laser occupancy grid of FIG. 5. Further, in FIG. 6, the object appears in cells (4,2) and (4,3), whereas the equivalent cells in FIG. 5, which contain the same object, are cells (4,4) and (4,5).

To facilitate temporal and spatial alignment, in accordance with one technique that may be applied to any method disclosed herein, the laser occupancy grid and the radar occupancy grid are collected from the same field of view during a simultaneous interval, or over a maximum time span where not collected simultaneously.

In a second stage, a Bayes filter is applied to combine the probabilities in spatially and temporally corresponding cells of the laser occupancy grid and radar occupancy grid to composite probability levels. The resultant output of the second stage may comprise a composite occupancy grid.

In the third stage, the data processing system 26 converts or transforms the probability levels of the cells of the composite occupancy grid into the composite evidence grid. The third stage may be referred to as a digitization stage. Each probability level is associated with a set of possible values (e.g., binary values). The probability levels are divided into two or more ranges, and a state value is associated with each corresponding range. In one example, the probability levels are divided into two or more ranges, where every probability below a threshold is assigned one binary value (e.g., 0) and every probability above a threshold is assigned another binary value (e.g., 1). In another example, the probability levels may be divided into three ranges: a lower range, a middle range, and an upper range. Further, the upper range is associated with a value that indicates the presence of an object in a cell, the lower range is associated with a value that indicates the absence of an object in a cell, and the medium range is inconclusive as to whether there is an object present or absent in the cell.

Figure 8:
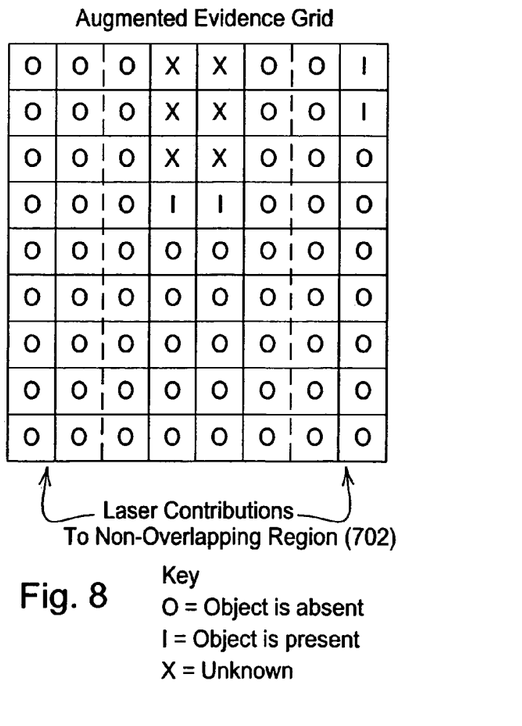
FIG. 8 is an augmented evidence grid where the composite evidence grid is combined with evidence transformation of the laser occupancy grid of FIG. 5 for the non-overlapping regions.

FIG. 8 is an augmented evidence grid where the composite evidence grid (e.g., composite evidence grid of FIG. 7) is combined with evidence transformation of the laser occupancy grid (e.g., laser occupancy grid of FIG. 5) for the non-overlapping regions 701. The augmented evidence grid (e.g., augmented evidence grid of FIG. 8) access or retrieves the composite evidence grid to form an addendum evidence grid or laser contributions 702 to fill the non-overlapping region 701 of the cells. The data processing system 26 converts or transforms the probability levels of the cells of the laser occupancy grid (or a part thereof corresponding to the non-overlapping region) into a laser evidence grid to fill the non-overlapping region 701 of the cells. As shown the augmented evidence grid discloses the existence of an additional object in cells (1,8) and (2,8). The additional object was sensed by the laser system 10 and recorded in the laser occupancy grid in cells (1,8) and (2,8) as shown in FIG. 5.

The data processing system 26 accesses the laser occupancy grid. Each probability level in the laser occupancy grid is associated with a set of possible values (e.g., binary values) that may indicate whether or not an object is present in a particular cell. The probability levels are divided into two or more ranges, and a state value is associated with each corresponding range. In one example, the probability levels are divided into two or more ranges, where every probability below a threshold is assigned one binary value (e.g., 0) and every probability above a threshold is assigned another binary value (e.g., 1). In another example, the probability levels may be divided into three ranges: a lower range, a middle range, and an upper range. Further, the upper range is associated with a value that indicates the presence of an object in a cell, the lower range is associated with a value that indicates the absence of an object in a cell, and the medium range is inconclusive as to whether there is an object present or absent in the cell.

The system and method supports using data from sensors operating over different frequency ranges (e.g., optical frequency range versus microwave frequency range) to characterize objects, such as trees or obstacles in a reliable manner. By using dual frequency ranges, the system and method overcomes the negative effects of rain, snow and fog on the laser system 10 performance and radar antenna characteristics that negatively effect resolution. Accordingly, greater automation may be introduced into timber harvesting, such as automating tree grading and other harvesting tasks. With increased automation, operator error and fatigue is reduced, and timber yields and harvesting efficiencies are increased.

Having described the preferred embodiment, it will become apparent that various modifications can be made without departing from the scope of the invention as defined in the accompanying claims.

What is claimed is:

1. A method of detecting an object, the method comprising:

transmitting a laser transmission over a first frequency range in a first zone;

receiving a reflection of the laser transmission from an object in the first zone to determine laser observed data associated with points on the object;

processing the laser observed data to form a later occupancy grid for the first zone;

transmitting a radar transmission over a second frequency range in a second zone that overlaps with the first zone;

receiving a reflection of the radar transmission from an object in the second zone to determine radar observed data associated with points on the object;

processing the radar observed data to form a radar occupancy grid for the second zone; and evaluating the radar occupancy grid and the laser occupancy grid to produce a composite evidence grid for at least an overlapping region defined by the first zone and the second zone.

2. The method according to claim 1 further comprising:

applying a first data processing technique in accordance with Bayes law to the observed laser data associated with different corresponding sample times to determine a laser occupancy grid; and applying a second data processing technique in accordance with Bayes law to the observed radar data associated with different corresponding sample times to determine a temporal radar occupancy grid.

3. The method according to claim 2 wherein the evaluating comprises applying a third data processing technique in accordance with Bayes law with respect to the laser occupancy grid and the radar occupancy grid to form a composite evidence grid for an overlapping region defined by an intersection of the first zone and the second zone.

4. The method according to claim 1 wherein the laser occupancy grid is a two-dimensional grid; each cell in the laser occupancy grid containing a probability with a range from 0 to 1 that a respective spatial region represented by the cell of the grid is occupied by an object; and wherein the radar occupancy grid is a two-dimensional grid; each cell in the radar occupancy grid containing a probability with a range from 0 to 1 that a respective spatial region represented by the cell is occupied by an object.

5. The method according to claim 1 wherein the laser occupancy grid is a three-dimensional grid; each cell in the laser occupancy grid containing a probability with a range from 0 to 1 that a respective spatial region in the grid is occupied by an object and; wherein the radar occupancy grid is a three-dimensional grid; each cell in the radar occupancy grid containing a probability with a range from 0 to 1 that a respective spatial region in the grid is occupied by an object.

6. The method according to claim 1 further comprising transforming probability levels of the cells of the laser occupancy grid for a non-overlapping region within the first zone to form an addendum evidence grid; and combining the addendum evidence grid to the composite evidence grid to form an augmented evidence grid.

7. The method according to claim 1 further comprising:

defining an object representation for the object in the first zone by defining a boundary of the object from the composite evidence grid and estimating at least one dimension associated with the defined boundary.

8. The method according to claim 7 further comprising:

characterizing the object as a trunk, a limb, or another tree portion based on the defined object representation.

9. A system for detecting an object, the system comprising:

a source for transmitting a laser transmission in a first zone;

a detector for receiving a reflection of the laser transmission from an object in the first zone to determine laser observed data associated with points on the object;

a transmitter for transmitting a radar transmission in a second zone that overlaps with the first zone;

a receiver for receiving a reflection of the radar transmission from an object in the second zone to determine radar observed data associated with points on the object;

a data processing system for processing the determined laser observed data to form a laser occupancy grid for the first zone and for processing the determined radar observed data to form a radar occupancy grid for the second zone; and an evaluator for evaluating the radar occupancy grid and the laser occupancy grid to produce a composite evidence grid for at least an overlapping region defined by the first zone and the second zone.

10. The system according to claim 9 wherein the data processing system applies a first data processing technique in accordance with Bayes law to the observed laser data associated with different corresponding sample times to determine a laser occupancy grid; the data processing system applies a second data processing technique in accordance with Bayes law to the observed radar data associated with different corresponding sample times to determine the radar occupancy grid.

11. The system according to claim 10 wherein the evaluator applies a third data processing technique in accordance with Bayes law with respect to the laser occupancy grid and the radar occupancy grid to form a composite evidence grid for the overlapping region defined by the first zone and the second zone.

12. The system according to claim 9 wherein the laser occupancy grid is a two-dimensional grid; each cell in the laser occupancy grid containing a probability with a range from 0 to 1 that a respective spatial region represented by the cell of the grid is occupied by an object; and wherein the radar occupancy grid is a two-dimensional grid; each cell in the radar occupancy grid containing a probability with a range from 0 to 1 that a respective spatial region represented by the cell is occupied by an object.

13. The system according to claim 9 wherein the laser occupancy grid is a three-dimensional grid; each cell in the laser occupancy grid containing a probability with a range from 0 to 1 that a respective spatial region in the grid is occupied by an object and; wherein the radar occupancy grid is a three-dimensional grid; each cell in the radar occupancy grid containing a probability with a range from 0 to 1 that a respective spatial region in the grid is occupied by an object.

14. The system according to claim 9 further comprising:

a definer for defining an object representation for the object in the first zone and the object in the second zone, where the object represents a single object.

15. The system according to claim 14 further comprising:

a characterization module for characterizing the object as a trunk, a limb, or another tree portion based on the defined object representation.

16. The system according to claim 9 further comprising:

a definer for defining an object representation for the object in the first zone; the definer comprising a boundary definition module for defining a boundary of the object from the composite evidence grid and a dimension estimator for estimating at least one dimension associated with the defined boundary.

17. A method of detecting an object, the method comprising:

transmitting a laser transmission at a known angular orientation over a first frequency range in a first zone;

receiving a reflection of the laser transmission from an object in the first zone to determine laser range data associated with points on the object for known angular orientation data;

processing the laser observed data to form a laser occupancy grid for the first zone;

transmitting a radar transmission at a known angular position over a second frequency range in a second zone that overlaps with the first zone;

receiving a reflection of the radar transmission from an object in the second zone to determine radar range data associated with points on the object for the known angular position data;

processing the radar range data and corresponding known angular position data to form a radar occupancy grid for the second tone; and evaluating the radar occupancy grid and the laser occupancy grid to produce a composite evidence grid for at least an overlapping region defined by the first zone and the second zone.

18. The method according to claim 17 further comprising:

applying a first data processing technique in accordance with Bayes law to the observed laser data associated with different corresponding sample times to determine a laser occupancy grid; and applying a second data processing technique in accordance with Bayes law to the observed radar data associated with different corresponding sample times to determine a temporal radar occupancy grid.

19. The method according to claim 18 wherein the probability levels of the laser occupancy grid are determined in accordance with the following equation:

$$p\langle l_{i,j}|m_t,\ldots,m_1\rangle = \frac{p\langle m_t|l_{i,j}\rangle p\langle l_{i,j}|m_{t-1},\ldots,m_0\rangle}{p(m_t)}, \text{ where } p\langle l_{i,j}|m_t,\ldots,m_1\rangle$$

is the probability that cell (i,j) is in a state l over a time frame representing a group of samples at corresponding times $m_1$ through $m_t$, where $p\langle m_t|l_{i,j}\rangle$ is the probability of obtaining the sample $m_t$, given that the cell (i,j) is in the state $l_{i,j}$, where $p\langle l_{i,j}|m_{t-1},\ldots,m_0\rangle$ is the probability of observing the cell (i,j) in state $l_{i,j}$ over the time frame representing a group of samples from $m_{t-1}$ until $m_o$, and where $p(m_t)$ is a normalization factor or the probability of obtaining the sample at time $m_t$.

20. The method according to claim 18 wherein the probability levels of the radar occupancy grid are determined in accordance with the following equation:

$$p\langle r_{i,j}|m_t,\ldots,m_1\rangle = \frac{p\langle m_t|r_{i,j}\rangle p\langle r_{i,j}|m_{t-1},\ldots,m_0\rangle}{p(m_t)}, \text{ where } p\langle r_{i,j}|m_t,\ldots,m_1\rangle$$

is the probability that cell (i,j) is in a state r over a time frame representing a group of samples at corresponding times $m_1$ through $m_t$, where $p\langle m_t|r_{i,j}\rangle$ is the probability of obtaining the sample $m_t$, given that the cell (i,j) is in the state $r_{i,j}$, where $p\langle r_{i,j}|m_{t-1},\ldots,m_0\rangle$ is the probability of observing the cell (i,j) in state $r_{i,j}$ over the time frame representing a group of samples from $m_{t-1}$ until $m_o$, and where $p(m_t)$ is a normalization factor or the probability of obtaining the sample at time $m_t$.

21. The method according to claim 18 wherein the evaluating comprises applying a third data processing technique in accordance with Bayes law with respect to the laser occupancy grid and the radar occupancy grid to form a composite evidence grid for an overlapping region defined by an intersection of the first zone and the second zone.

22. The method according to claim 21 wherein the composite occupancy grid or precursor to the composite evidence grid is determined by the following equation:

$$p\langle c_{i,j}|l_{i,j},r_{i,j}\rangle = \frac{p(c_{i,j})p\langle l_{i,j},r_{i,j}|c_{i,j}\rangle}{p(l_{i,j},r_{i,j})}, \text{ where } p\langle c_{i,j}|l_{i,j},r_{i,j}\rangle$$

is the probability that cell (i,j) of the composite occupancy grid is in a state c (e.g., occupied empty or unknown) given the laser probability grid is in state $l_{i,j}$ and given the radar occupancy grid is in state $r_{i,j}$, where $p(c_{i,j})$ is the probability of obtaining that cell (i,j) is in the state $c_{i,j}$, where $p\langle l_{i,j},r_{i,j}|c_{i,j}\rangle$ is the probability of observing the cell (i,j) of the laser occupancy grid in state l and of the radar probability grid in state r, given that the composite occupancy grid is in state c, and where $p(l_{i,j},r_{i,j})$ is the probability of obtaining the entries in cell (i,j) of the laser occupancy grid in state l and of the radar occupancy grid in state r.

23. The method according to claim 17 further comprising transforming probability levels of the cells of the laser occupancy grid for a non-overlapping region within the first zone to form an addendum evidence grid; and combining the addendum evidence grid to the composite evidence grid to form an augmented evidence grid.

* * * * *